United States Patent [19]

Nicia

[11] Patent Number: 4,472,797
[45] Date of Patent: Sep. 18, 1984

[54] OPTICAL MULTIPLEXER

[75] Inventor: Antonius J. A. Nicia, Eindhoven, Netherlands

[73] Assignee: U.S. Philips Corporation, New York, N.Y.

[21] Appl. No.: 362,444

[22] Filed: Mar. 26, 1982

[30] Foreign Application Priority Data

Apr. 14, 1981 [NL] Netherlands .................... 8101826

[51] Int. Cl.³ ............................................ H04J 15/00
[52] U.S. Cl. ..................................... 370/1; 350/96.19
[58] Field of Search ................ 370/1, 3, 4; 350/96.15, 350/96.18, 96.19, 169, 170; 455/601, 612, 610; 358/226, 901

[56] References Cited

U.S. PATENT DOCUMENTS

| | | | |
|---|---|---|---|
| 2,894,427 | 7/1959 | Sabater | 350/170 |
| 3,490,830 | 1/1970 | Cooper | 350/169 |
| 3,584,230 | 6/1971 | Tien | 350/96.18 |
| 3,932,702 | 1/1976 | Shelley et al. | 350/170 |

OTHER PUBLICATIONS

I.E.E.E. Transactions on Communications, vol. COM-26, No. 7, Jul. 1977, Viabilities of the Wavelength-Division-Multiplexing Transmission System Over an Optical Fiber Cable, Tetsuya Miki et al., pp. 1082–1087.

Applied Optics, vol. 21, No. 23, Dec. 1, 1982, Optical Fiber Power-Splitter with Selectable Splitting Ratio, P. Matthiusse et al., pp. 4290–4295.

Primary Examiner—Douglas W. Olms
Assistant Examiner—Frank M. Scotch, III
Attorney, Agent, or Firm—Marc D. Schechter

[57] ABSTRACT

An optical multiplexer whereby the light from a plurality of optical fibers can be combined in an optical transmission fiber via an input lens, a prism and an output lens. The lenses are preferably ball-lenses. The multiplexer does not comprise any color-selective elements.

17 Claims, 9 Drawing Figures

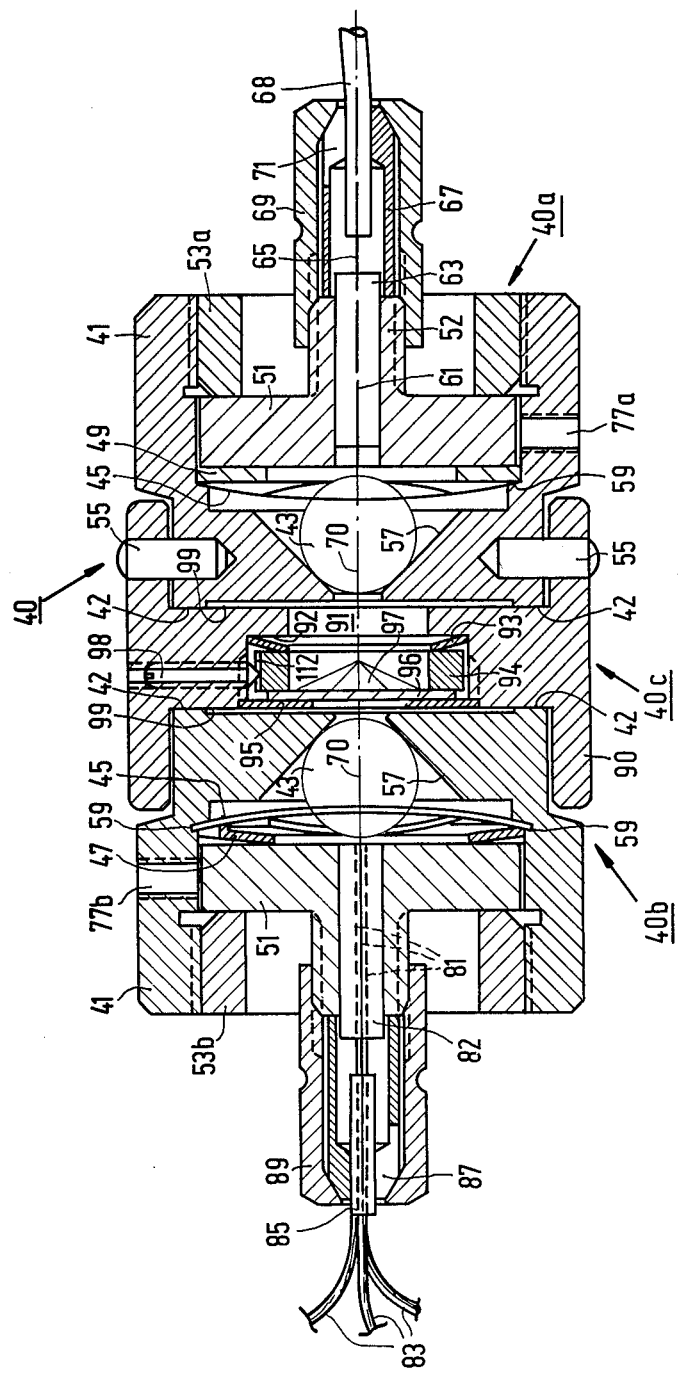

OPTICAL MULTIPLEXER

BACKGROUND OF THE INVENTION

The invention relates to an optical multiplexer for transmitting light supplied by a plurality of input optical fibers to a single output optical fiber. The multiplexer comprises an input lens system and an output lens system for imaging end faces of the input fibers onto the end face of the output fiber. The end faces of the input fibers are situated in the focal plane of the input lens system.

An optical multiplexer of this kind is known from an article by T. Miki et al entitled "Viabilities of the Wavelength-Division-Multiplexing Transmission System Over an Optical Fiber Cable" IEEE Transactions on Communications, Volume COM-26, No. 7, July 1978, pages 1082–1087. For each input fiber the multiplexer described in the article comprises an input lens whose optical axis must be aligned with respect to the optical axis of the optical fiber, and an output lens which is arranged between the input lenses and the output fiber. The optical axis of the output lens and the optical axis of the output fiber should coincide. It will be evident, even though the mechanical construction of the published multiplexer is not described, that a comparatively large number of accurate positioning operations will be necessary in this multiplexer (for example, each fiber must be positioned with respect to the associated input lens). Furthermore, the multiplexer introduces a comparatively high attenuation (12 dB) in the path of the optical signals to be transmitted.

SUMMARY OF THE INVENTION

It is an object of the invention to provide an optical multiplexer which introduces only low attenuation in the path of the optical signals to be transmitted.

It is a further object of the invention to provide an optical multiplexer which utilizes few parts which require manufacturing to a high-precision and in which the number of accurate positioning operations to be performed is limited.

In an optical multiplexer according to the invention, between the input lens system and the output lens system there is arranged at least one prism, a symmetry axis of which coincides at least substantially with the optical axis of the output lens system.

The faces of the prism constitute discontinuities for the light beams. According to the invention, the input beams of parallel light rays which are formed by the input fibers and the input lens system are refracted by the prism so that the refracted input beams are directed onto the output lens system as though they were a single parallel beam. The refracted input beams are then all parallel to the optical axis of the output lens system.

The radius within which the input beams must be approximately situated is equal to $f_o \cdot NA_O$, $f_o$ being the focal distance of the output lens system and $NA_O$ the numerical aperture of the output fiber. Moreover, the respective input beams should not encroach onto adjacent refractive faces of the prism, because otherwise some of the light associated with an input beam will be refracted in a different direction, thus giving rise to a loss of light. Moreover, the end face of the input fiber should not be made so large that a substantial part of the image of that end face is siuated outside the end face of the output fiber. When these conditions are satisfied, a low-loss or loss-free multiplexer is realized (if the beams do not overlap).

In one embodiment of an optical multiplexer according to the invention, the input lens system and the output lens system each consist of a single lens. The lenses have a common optical axis. In a device of this kind, the input fibres may be stacked and arranged in the desired position about the optical axis in one operation.

In a preferred embodiment of an optical multiplexer according to the invention, the input lens system and the prism are mounted in an input housing which comprises a bore. In the bore there is formed a seat and an abutment on which the input lens system, consisting of a convex lens and the prism, respectively, is secured. A plane which is defined by the abutment is directed transverse with respect to the optical axis of the lens and parallel to a face formed on the input housing. The bore opens into the face which is contacted by an end face of a lens holder in which at least the output lens system is mounted.

BRIEF DESCRIPTION OF THE DRAWING

FIG. 2a is a cross-sectional view of an embodiment of a device according to the invention.

DESCRIPTION OF THE PREFERRED EMBODIMENTS

Figure 1A:
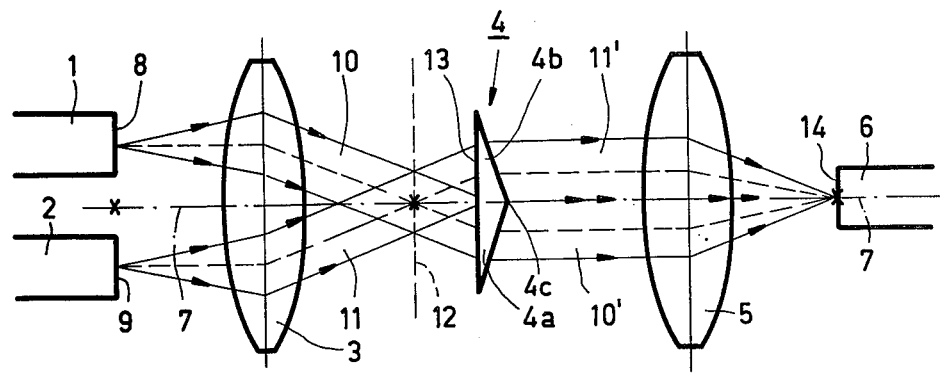
FIGS. 1a, 1b, 1c, 1d, 1e and 1f schematically show various embodiments of the optical multiplexer according to the invention.

FIG. 1a schematically shows two optical input fibers 1 and 2, an input lens system 3, a prism 4, an output lens system 5, and an optical output fiber 6. The lens systems 3 and 5 and the output fiber 6 have a common optical axis 7. The input fibers 1 and 2 are each arranged at the same short distance from and parallel to the optical axis 7. The end faces 8 and 9 of fibers 1 and 2 are situated in the focal plane of the lens system 3.

Each lens system 3 or 5 comprises one or more lenses, but preferably consists of one ball-lens only. The lens 3 is a collimator lens and forms parallel light beams 10 and 11 from the diverging light beams emitted by the fibers 1 and 2. The said parallel light beams are inclined at a small angle with respect to one another.

The light beams 10 and 11 intersect in the focal plane 12 of the lens 3. At a distance which is greater than the distance between the focal plane 12 and the lens 3, there is arranged a prism 4 which is symmetrically arranged with respect to the optical axis 7, and whose flat base 13 faces the lens 3. The prism 4 refracts the intersecting light beams 10 and 11 so that these beams form parallel light beams 10' and 11' after having passed through the prism 4. The parallel light beams 10' and 11' form one contiguous light beam which is focussed onto the end face 14 of the output fiber 6 by means of the output lens 5.

If it is assumed that the two input fibers 1 and 2 have an optical core diameter $a_i$ and a numerical aperture $NA_i$, and if is also assumed that the output fiber 6 has a core diameter $a_o$ and a numerical aperture $NA_o$, and that the input lens 3 and the output lens 5 have a focal distance $f_i$ and $f_o$ respectively then in order to produce an optical multiplexer without any coupling loss, the following conditions must be satisfied:

$2 \cdot NA_i \cdot fi \leq NA_o \cdot fo$ and $fo \cdot a_i < fi \cdot a_o$.

Figure 1B:
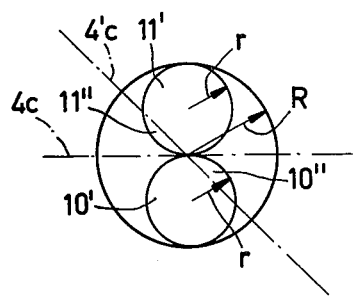

The expression $NA_i \cdot fi$ is the radius r of the collimated light beams 10 and 11, and 10′ and, 11′. When both conditions are satisfied and the light beams 10′, 11′ are incident completely within the circle having a radius $R = fo \cdot NA_o$ (see FIG. 1b) which actually represents the beam diameter which would be formed by the output lens 5 if the output fiber 6 itself were to emit light.

Thus, no loss will occur if the product of the numerical aperture $NA_i$ and the core diameter $a_i$ of the input fibers 1 and 2 is small enough and/or if the product of the numerical aperture $NA_o$ and the core diameter $a_o$ of the output fiber 6 are chosen to be large enough. It will be apparent that the foregoing situation can occur only if the beams 10 and 11 pass completely through the prism halves 4a and 4b, respectively. This can be realized by adapting the orientation of the prism 4 to the positioning of the input fibers 1 and 2 (by rotation of the prism 4 about the optical axis 7). The correct orientation of the prism 4 can be checked by examining the cross-section of the beams 10′ and 11′ for symmetry. An axis of symmetry 4c which separates the two prism halves 4a and 4b should extend exactly between the beams 10′ and 11′ in the cross-section of the light beams 10′ and 11′. If the orientation of the prism 4 is not correct, the apex or edge of the prism 4 will cut off parts of the beams 10 and 11 which are shown as the parts 10″ and 11″ of the beams 10′ and 11′ (the apex is shown as the line 4c′ in FIG. 1b).

However, there are a number of restrictions on account of which the condition imposed ($2 \cdot NA_i \cdot a_i \approx NA_o \cdot A_o$) can only be approximated. In order to realize a loss-free coupling, the use of input fibers having a small core diameter $a_i$ and a small numerical aperture would be advantageous. However, the input fibers must also be connected to light sources (semiconductor lasers) where as high as possible a coupling efficiency is also required. However, the use of a fiber having no less than some minimum core diameter (for example 30 μm) is then desirable, so that an arbitrarily, small value for the product $a_i \cdot NA_i$ may not be chosen. This means that the multiplexer cannot be constructed to be loss-free, but only to have a low-loss factor.

Figure 1C:
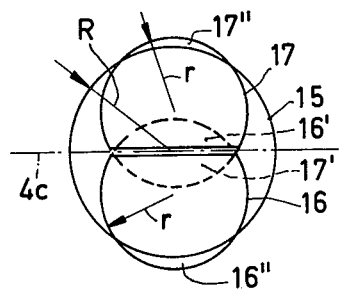

The foregoing will be explained with reference to FIG. 1c which shows a circle 15 having a radius R which represents the cross-section of a light beam which can be produced by means of the output fiber 6 and the lens 5. Also shown are portions of circles 16 and 17 which have a radius r and which represent the respective cross-sections of the light beams 10′ and 11′ obtained via the input fibers 1 and 2, the lens 3 and the prism 4.

In order to minimize the light loss, each circle 16 and 17 should fit "as well as possible" within the circle 15. Portions 16′ and 17′ of each circle 16 and 17 are cut off because, after the cross-over point the light beams 10 and 11 will not be wholly incident on the associated half 4a and 4b of the prism 4. The portions incident on the wrong side of the dividing line 4c of the prism 4 will not be refracted in the direction of the optical axis 7 and will be lost. These wasted portions of the light beams 10 and 11 can be reduced by increasing the distance between the prism 4 and the lens 3. The circles 16 and 17 will then be shifted away from the center of the circle 15, so that the circles 16 and 17 will overlap to a smaller extent.

However, by increasing the distance between prism 4 and lens 3, the portions 16″ and 17″ which lie outside the circle 15 (and which thus also contribute to the loss of the multiplexer) will then be increased. A given ratio of the values $NA_i \cdot a_i$ and $NA_o \cdot a_o$ is associated with each given distance between the lens 3 and the prism 4 for which the light loss is minimum.

Figure 1D:
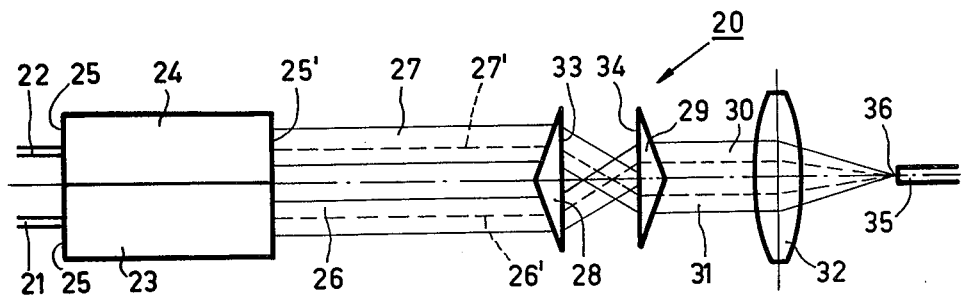

FIG. 1d shows an optical diagram of an embodiment of a multiplexer 20 according to the invention. The device 20 comprises several optical input fibers 21 and 22, each of which is aligned with respect to an axial cylindrical, graded refractive index lens 23 or 24 which has a refractive index which decreases as a function of the radius. The lenses 23 and 24, have a length which corresponds to one quarter of the propagation guide mode wavelength of the light in the lenses 23 and 24. The input face 25 is also the plane of the focus of the lenses 23 and 24, so that the light radiated into the lenses 23 and 24 via the fibers 21 and 22 emerges from the lenses in the form of parallel beams 26 and 27.

The parallel beams 26 and 27 are situated at a distance from one another which equals the center-to-center distance between the lenses 23 and 24. The center lines of the beams 26 and 27 are denoted by the reference numerals 26′ and 27′ in the figure. The beams 26 and 27 are refracted by a multi-facet prism 28, so that they intersect one another and are incident on a second (similarly shaped) prism 29. The prism 29 refracts the light beams once more, but now in the opposite direction, so that beyond the prism 29 parallel and contiguous light beams 30 and 31 are produced occur.

The distance between the facing bases 33, 34 of the prisms 28 and 29, defines the diameter of the outer boundary of the light beams 30 and 31. The light beams 30 and 31 can be considered to form a single beam which is focussed onto the end face 36 of an output fiber 35 via an output lens 32. The outer diameter of the light beams 30 and 31 should be approximately equal to $fo \cdot NA_o$, fo being the focal distance of the output lens 32 and $NA_o$ being the numerical aperture of the output fiber 35.

Figure 1E:
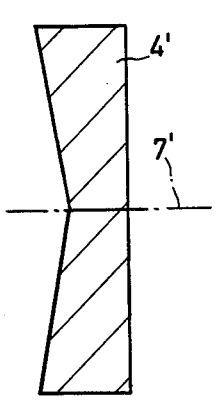

The prism shown in FIG. 1a could be replaced by a "concave" prism 4′ which is shown in a sectional view in FIG. 1e. The distance between the prism 4′ and the lens 3, however, should then be less than the focal distance of the lens 3 in order to obtain the same effect as obtained by means of the prism 4 (FIG. 1a). FIG. 1e also shows the symmetry axis 7′ (which should coincide with the optical axis 7 of FIG. 1a).

Figure 1F:
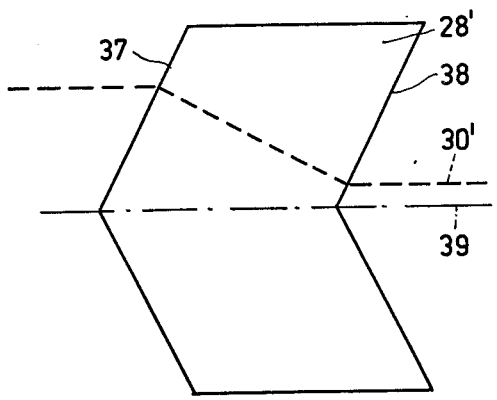

The two prisms 28 and 29 shown in FIG. 1d can be replaced by a prism 28′ as shown in FIG. 1f. The broken line 30′ denotes the refraction path of a light ray via two surfaces 37 and 38 to illustrate a parallel shift, toward the symmetry axis 39, of a light beam 30′ incident on the surface 37.

The embodiment of an optical multiplexer 40 according to the invention which is shown in FIG. 2a comprises two lens holders 40a and 40b and a prism holder 40c. Each lens holder 40a and 40b comprises a (circular) cylindrical housing 41, an input lens system and an output lens system. Each lens system comprises a ball-lens 43. Each lens holder further includes a lens clamp 45, adjusting means in the form of adjusting rings 53a, and 53b, and a resilient element (for example, a cupped spring washer 47 or an elastic plastic ring 49), a disk-shaped fiber holder 51 and some further parts to be described hereinafter.

In the housing 41 there are secured two pins 55 which form a bayonet quick-connect coupling in conjunction with slots (not visible in the figure) provided in the prism holder 40c. Those in the lens holder 40a are turned through one quarter turn with respect to those in the lens holder 40b, so that only the pins 55 in the lens holder 40a are visible.

Each of the lens holders 40a and 40b has a seat 57 on which the respective ball-lens 43 is clamped by means of the lens clamp 45. The lens clamp 45 is secured in a groove 59 in the corresponding lens holder 40a or 40b. In the lens holder 40a, the lens clamp 45 and the groove 59 are only shown schematically.

The ball-lenses 43 in the lens holders 40a and 40b need not have the same diameter (as shown for the sake of simplicity). The diameter of the output lens 43 in the lens holder 40a is customarily larger (1.3 to 2 times larger) than the input lens 43 in the lens holder 40b.

Before the lens holders 40a and 40b and the prism holder 40c are assembled to form a multiplexer 40, one end 61 of the output optical fiber 65 is glued in a capillary tube 63 which is secured in the fiber holder 51 by means of a thermosetting epoxy resin. Furthermore, the fiber 65 is strain-relieved by means of a clamping sleeve 67 and a clamping nut 69. To achieve this, the clamping nut 69 is screwed onto a threaded boss 52 of the fiber holder 51. The cut cap 71 of the clamping sleeve 67 is then clamped onto the secondary coating 68 of the fiber 65.

Subsequently, the fiber holder 51 is arranged against the resilient element (cupped spring washer 47 or ring 49) in the housing 41, and the adjusting ring 53a is screwed into the housing 41. The fiber end 61 must be positioned with respect to the output lens 43. The fiber end 61 is moved toward or away from the ball-lens 43 by screwing the adjusting ring 53 further into or out of the housing 41, depending on the focal distance of the lens 43. Using adjusting screws 77a (only one of the three screws spaced equally around the circumference of the fiber holder is shown), the fiber holder 51 and hence the fiber end 61 can be displaced at right angles to the optical axis of the lens 43, so that the optical fiber 65 can be aligned with respect to the optical axis of the lens 43.

The lens holder 40b is assembled in almost the same way as the lens holder 40a. Instead of a single fiber end, the ends 81 of input fibers 83 which supply light of different wavelength are secured in a mounting support yet to be described. The fibers 83 are passed through a plastic sleeve 85 and are secured in the manner described above by means of a clamping sleeve 87 and a clamping nut 89. Subsequently, the fiber ends 81 are placed at the correct distance from lens 43 by means of the adjusting ring 53b and in the radial correct position (all at the same distance from the optical axis 70) by means of the adjusting screws 77b.

The prism holder 40c comprises a prism housing 90 which comprises a bore 91. A resilient element (for example a cupped spring washer 93) is arranged against an abutment face 92 formed about the bore 91 within the housing 90. The prism 97 is arranged between the resilient element and a mounting ring 95. The prism 97 is glued onto a flat glass plate 96 which in turn is glued onto a rigid positioning ring 94. The mounting ring 95 is secured to the housing 90 by means of a screw-threaded portion.

The prism 97 is displaceable in two transaxial directions between the mounting ring 95 and the resilient element 93, so that a symmetry axis of the prism 97 which is directed perpendicularly with respect to the base glued onto the glass plate 96 can be shifted until it coincides with the optical axis 70. The displacement of the positioning ring 94 together with the prism 97, is realized in known manner by means of three adjusting screws 98, only one of which is shown in the figure.

The lens holders 40a and 40b contact the prism housing 90 via the end faces 42 formed thereon. The end faces 42 and the contacting end surfaces 99 of the housing 90 should be directed at right angles to the optical axis 70, because otherwise the optical axes 70 of the lenses 43 and the symmetry line of the prism 97 could not be made to coincide or to extend parallel to one another.

The optical multiplexer 40 shown in FIG. 2a offers the advantage that the input section (lens holder 40b) and the output section (lens holder 40a) are substantially identical parts. Furthermore, the prism holder 40c has a very simple construction whose manufacture does not require high-precision operations (for example, better than 0.05 mm), and neither does the manufacture of the lens holders 40a and 40b. Only one part, the mounting support 82, is preferably manufactured to a high precision, as will be explained hereinafter.

Figure 2B:
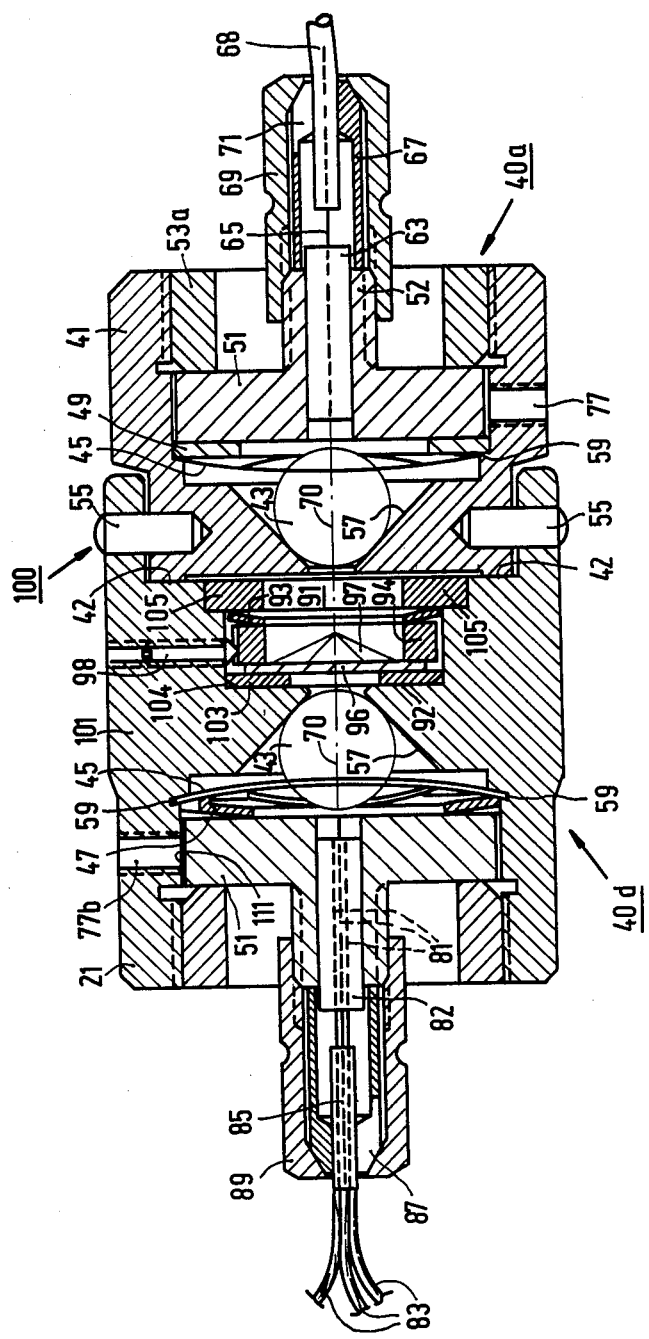
FIG. 2b is a cross-sectional view of a preferred embodiment of a device accoding to the invention.

The optical multiplexer 100 shown in FIG. 2b comprises an input section 40d and lens holder 40a as described in detail with reference to FIG. 2a. The reference numerals of the parts of the lens holder 40a, therefore, correspond to the numerals used in FIG. 2a.

The input section 40d comprises the same parts as the lens holder 40b of FIG. 2a, with the exception of the housing 41 and some other components yet to be described. Therefore, these parts are denoted by the same reference numerals. The input section 40d also comprises one housing 101 in which the ball-lens 43 and the prism 97 are secured. The prism unit, consisting of the positioning ring 94, the glass plate 96 and the prism 97, is clamped between a ring 103 and the cupped spring washer 93, so that the prism 97 can be displaced transversely with respect to the optical axis 70 by means of three adjusting screws 98. A mounting ring 105 is secured in the holder 101 by means of a screw threaded portion.

Figure 3:
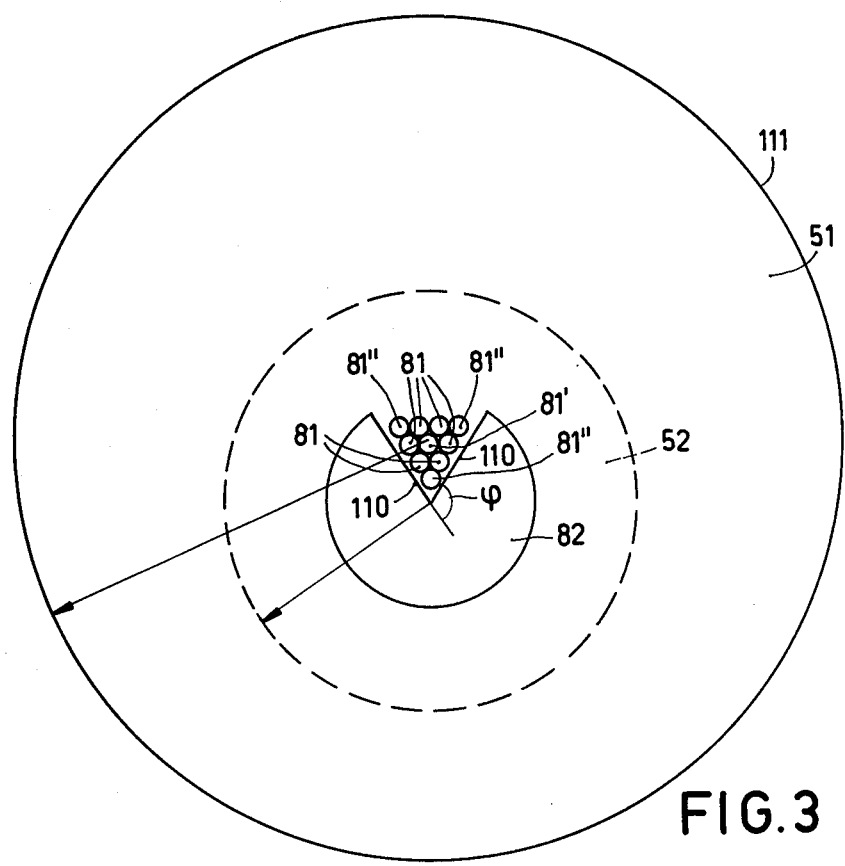
FIG. 3 is a cross-sectional view of a fiber holder with fibers for use with a prism having six facets.

FIG. 3 shows a fiber holder 51 in which there is mounted a support 82 for the ends 81 of the optical fibers 83. The mounting support 82 is a circularly cylindrical rod with a milled V-groove. The walls 110 of the groove enclose an angle of 60° (so that the supplement $\phi$ is 120°). Between the walls 110 six fiber ends 81 of the same diameter (for example 125 $\mu$m) are stacked. In the center thereof, an optical fiber 81' of the same diameter is arranged. Also arranged in the groove 110 are three "dummy" fibres 81" in order to achieve stable stacking of the operative optical fiber ends 81 and the central fiber 81'. The fiber 81' is the optical center with respect to the ends 81 of the optical fibers 83.

After mounting the fiber ends 81, 81' and 81" in the V-groove and mounting the support 82 in the fiber holder 51, light is applied to the fiber 81', so that the fiber 81' can be aligned with respect to the optical axis 70 in known manner by displacement of the fiber holder 51 transversely with respect to the optical axis 70 by means of the adjusting screws 77b. The fiber ends 81 are thus all positioned at exactly the same distance from the optical axis 70 (FIGS. 2a and 2b). The six light beams formed via the lens 43 in the lens holder 40b for the input section 40d are converted, via the six-facet prism 97, into one "wide" light beam which is directed parallel to the optical axis 70.

In order to ensure that the orientation of the prism 97 is always the same, the positioning ring 94 is provided with a groove 112 which serves as a reference both when mounting the prism 97 and the glass plate 96 on the positioning ring 94 and when mounting the positioning ring 94 in the prism holder 40c. A similar method of orientation can be used when mounting the fiber ends 81 in the fiber holder 51 and when mounting the fiber holder 51 in the lens holder 41.

However, it is alternatively possible to turn (e.g. on a lathe) the outer edge 111 of fiber holder 51 (see FIG. 2b) in known manner so that it is concentric with the optical fiber 81'. The outer edge 111 will then be somewhat eccentric with respect to the support 82 and the boss 52 (the diameters of the support 82, the boss 52 and the fiber holder 51 are not to scale in the figure, and the eccentricity is exaggerated).

After alignment of the fiber 81' with respect to the optical axis 70 by means of the adjusting screws 77b, the desired orientation of the six fiber ends 81 with respect to the six-faceted prism 97 can be simply adjusted by a rotary displacement of the fiber holder 51. It will be evident that the operation of mounting the prism 97 will not be at all critical in the above case.

It will be apparent that the optical multiplexer according to the invention is suitable for combining light signals which are transmitted at different instants (time multiplexing) or which are simultaneously transmitted using a different wavelength (color/frequency multiplexing). Furthermore, the multiplexer is also suitable for combining light signals of the same wavelength which are transmitted simultaneously in order to create a more "powerful" light signal in order to cover a larger transmission distance. Furthermore, it will be clear that in addition to the described embodiments the multiplexer may also receive three, four, five etc. input signals which are supplied via a corresponding number of input fibers and which can be combined via a prism comprising three, four, five etc. facets.

What is claimed is:

1. An optical multiplexer for transmitting light from a plurality of input optical fibers to a single output optical fiber, each fiber having an end face and an optical axis, said multiplexer comprising:
   an output lens system having an optical axis;
   an input lens system having first and second focal planes on either side thereof, said input lens system being arranged on the optical axis of the output lens system, the output lens system being on the side of the second focal plane, in operation the end faces of the input fibers being situated in the first focal plane; and
   a prism arranged between the input and output lens systems, said prism having an axis of symmetry which lies substantially on the optical axis of the output lens system.

2. An optical multiplexer as claimed in claim 1, characterized in that the prism has a flat base which is perpendicular to the symmetry axis.

3. An optical multiplexer as claimed in claim 2, characterized in that:
   the prism has an apex angle at the symmetry axis in each cross-section through the prism along the symmetry axis, each said apex angle being less than 180°; and
   the distance between the prism and the input lens system is greater than the distance between the second focal plane and the input lens system.

4. An optical multiplexer as claimed in claim 3, characterized in that each lens system consists of a single lens.

5. An optical multiplexer as claimed in claim 3, characterized in that the flat base of the prism faces the input lens system.

6. An optical multiplexer as claimed in claim 2, characterized in that each lens system consists of a single lens.

7. An optical multiplexer as claimed in claim 1, characterized in that each lens system consists of a single lens.

8. An optical multiplexer as claimed in claim 1, characterized in that:
   the input lens system comprises an input lens associated with each input optical fiber, each input lens having an optical axis coinciding with the optical axis of its associated input optical fiber, all of said optical axes being parallel to one another; and
   the prism has at least two surfaces corresponding to each input lens, said surfaces effecting a parallel shifting toward the optical axis of the output lens system of a light beam from each input lens.

9. An optical multiplexer for transmitting light from a plurality of input optical fibers to a single output optical fiber, each fiber having an end face and an optical axis, said multiplexer comprising:
   an output lens system having an optical axis;
   an input lens system having first and second focal planes on either side thereof, said input lens system being arranged on the optical axis of the output lens system, the output lens system being on the side of the second focal plane, in operation the end faces of the input fibers being situated in the first focal plane, the input lens system comprising an input lens associated with each input optical fiber, each input lens having an optical axis coinciding with the optical axis of the associated input optical fiber, all of said optical axes being parallel to one another; and
   two prisms arranged between the input and output lens systems, said prisms having axes of symmetry lying substantially on the optical axis, each prism having a flat base perpendicular to its symmetry axis and facing the other prism, the prisms having surfaces corresponding to each input lens, said surfaces effecting a parallel shifting toward the optical axis of the output lens system of a light beam from each input lens.

10. An optical multiplexer for trammsitting light from a plurality of input optical fibers to a single output optical fiber, each fiber having an end face, said multiplexer comprising:
   an output lens system having an optical axis;
   an input lens system having first and second focal planes on either side thereof, said input lens system being arranged on the optical axis of the output lens system, the output lens system being on the side of the second focal plane, in operation the end faces of the input fibers being situated in the first focal plane;
   two lens holders, each lens holder having an end face directed transverse to the optical axis, and having a seat on which is arranged one of the lens systems;
   a prism holder having a bore in which the prism is secured, and having two end faces on either side of the bore, each end face being directed transverse to the optical axis and bearing against an end face of one lens holder; and means for securing the lens holders to the prism holder.

11. An optical multiplexer as claimed in claim 10, characterized in that the lens holder in which the outut lens system is arranged is detachable.

12. An optical multiplexer as claimed in claim 10, characterized in that the multiplexer further comprises adjusting means for adjusting the radial position of the prism with respect to the optical axis.

13. An optical multiplexer as claimed in claim 10, characterized in that the multiplexer further comprises adjusting means for adjusting the radial position of each lens system with respect to the optical axis.

14. An optical multiplexer for transmitting light from a plurality of input optical fibers to a single output optical fiber, each fiber having an end face, said multiplexer comprising:

an output lens system having an optical axis;

an input lens system having first and second focal planes on either side thereof, said input lens system being arranged on the optical axis of the output lens system, the output lens system being on the side of the second focal plane, in operation the end faces of the input fibers being situated in the first focal plane;

an input housing having a bore in which there is a seat on which the input lens system consisting of a ball-lens is arranged and in which there is an abutment transverse to the optical axis on which the prism is arranged, said input housing having an end face directed transverse to the optical axis; and a lens holder having an end face directed transverse to the optical axis and having a seat on which is arranged the output lens system, the end face bearing against the end face of the input housing.

15. An optical multiplexer as claimed in claim 14, characterized in that the lens holder in which the output lens system is arranged is detachable.

16. An optical multiplexer as claimed in claim 14, characterized in that the multiplexer further comprises adjusting means for adjusting the radial position of the prism with respect to the optical axis.

17. An optical multiplexer as claimed in claim 14, characterized in that the multiplexer further comprises adjusting means for adjusting the radial position of each lens system with respect to the optical axis.

* * * * *